(12) United States Patent
Niewiadomski

(10) Patent No.: US 10,949,465 B1
(45) Date of Patent: *Mar. 16, 2021

(54) EFFICIENT GRAPH TREE BASED ADDRESS AUTOCOMPLETE AND AUTOCORRECTION

(71) Applicant: Amazon Technologies, Inc., Seattle, WA (US)

(72) Inventor: Robert Niewiadomski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/862,282

(22) Filed: Jan. 4, 2018

(51) Int. Cl.
*G06F 16/901* (2019.01)
*G06F 16/28* (2019.01)
*G06F 16/22* (2019.01)
*G06F 16/9032* (2019.01)

(52) U.S. Cl.
CPC ...... *G06F 16/9024* (2019.01); *G06F 16/2237* (2019.01); *G06F 16/282* (2019.01); *G06F 16/9027* (2019.01); *G06F 16/90324* (2019.01)

(58) Field of Classification Search
CPC .................................................. G06F 16/9024
See application file for complete search history.

(56) References Cited

U.S. PATENT DOCUMENTS

| 8,694,512 | B1 * | 4/2014 | Zhdanovich | ........ G06F 16/9537 707/748 |
| 2002/0129017 | A1 | 9/2002 | Kil | |
| 2015/0199418 | A1 | 7/2015 | Bayliss | |
| 2018/0173689 | A1 | 6/2018 | Pino | |

OTHER PUBLICATIONS

Sutton et al., "Adaptive Work-Efficient Connected Components on the GPU", (Year: 2016).*
Chegrane et al., "JQuery UI like approximate autocomplete", (Year: 2017).*
Sutton, et al., "Adaptive Work-Efficient Connected Components on the GPU," 2016, 4 pages.

* cited by examiner

*Primary Examiner* — Dawaune A Conyers
(74) *Attorney, Agent, or Firm* — Knobbe, Martens, Olson & Bear, LLP

(57) ABSTRACT

Aspects of the disclosure relate to generating a memory efficient, graph-based tree representation of an address database, where each vertex in the tree corresponds to an individual character in an address. Each address in the database is a string of hierarchical components, and the techniques create a separate tree for each component. Tree jumps connect the last vertex of the tree for one component to the root (first) vertex in the tree of the next component. Aspects of the disclosure relate to depth-first search techniques for determining alignment between a user-input address string and the sequences in such an address tree, for example, by searching first for sequences that exactly match the input and iteratively increasing the allowable edit penalty if not enough results are returned.

21 Claims, 8 Drawing Sheets

EFFICIENT GRAPH TREE BASED ADDRESS AUTOCOMPLETE AND AUTOCORRECTION

BACKGROUND

Auto-complete is a feature in which a computer application such as a browser, word processor, or search engine predicts the rest of a word a user is typing. When a user enters the first letter or letters of a word, for example, the autocomplete feature predicts one or more possible words as choices. If the user-intended word is included in the list, the user can select it, otherwise the user continues entering the next letters of the word and the choices are updated accordingly. Auto-correct is a similar feature that identifies and corrects certain spelling or typing errors as a user is typing.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
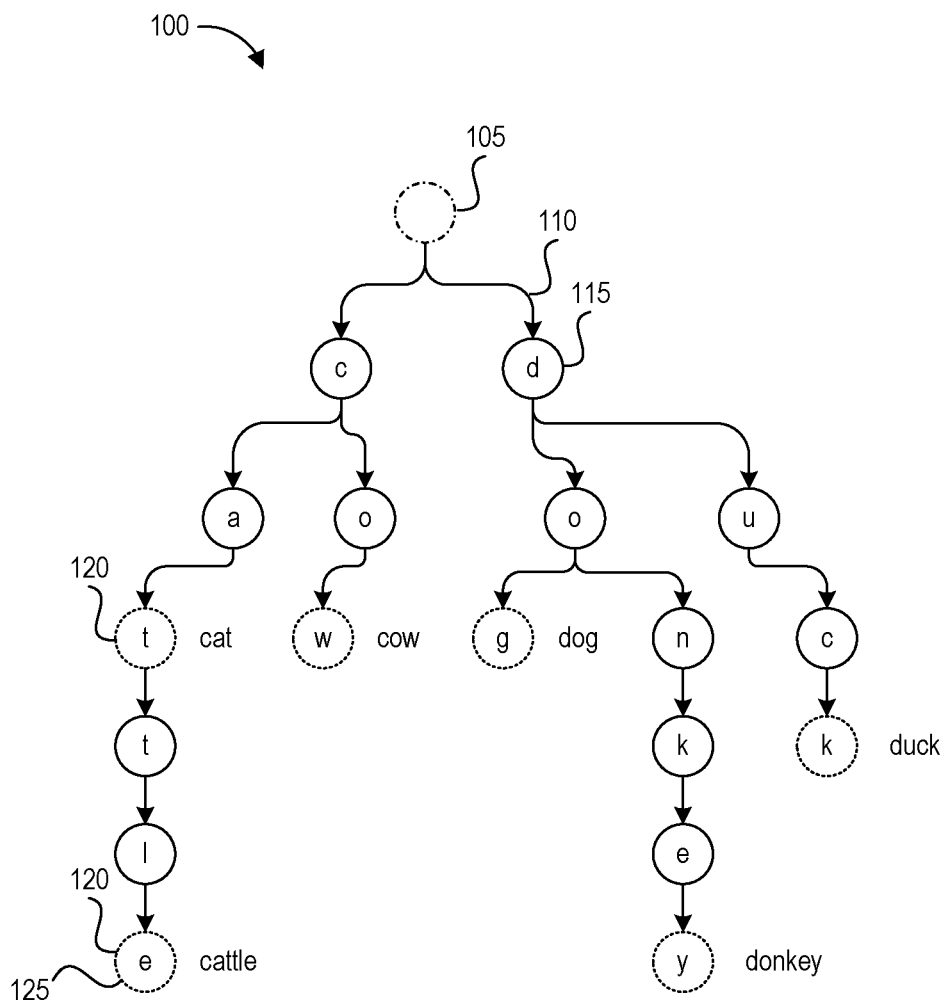
FIG. 1 illustrates an example sequence-catalog alignment tree for a sequence catalog including six words.

The present disclosure is generally directed to real-time address auto-correction and auto-completion, and to a memory-efficient graph tree address database and search techniques that enable the same to be performed using a single or limited number of computing devices. Auto-complete and auto-correct typically work best in domains with a limited number of possible words (such as in command line interpreters), when some words are much more common (such as when addressing an e-mail), or writing structured and predictable text (as in source code editors). In contexts such as address entries where the user-entered string is compared to millions of possible strings, the autocomplete comparison either runs much more slowly or requires significant computing resources in order to generate address predictions or corrections. Accordingly, existing solutions for real-time matching between user-entered address strings and large databases of addresses (for example, a national address database) typically require the use of many servers to generate suggestions with low latency. Further, the memory requirements for storing the address databases typically exceed the storage capacity of personal computing devices such as tablets, smartphones, and laptops. In addition, these address databases would typically have vast stores of caches available, further increasing the memory requirements.

The aforementioned problems, among others, are addressed in some embodiments by the graph tree address database representation and iterative depth-based search techniques of the present disclosure. The graph represents a search tree that encodes the character sequences of all entries in the database along with their algorithmically generated aliases while preserving hierarchical-relationship data. The search algorithm computes a sequence alignment of a user input with all entries encoded by the graph to produce a result set comprised of the most similar entries along with relevant suggestions derived from hierarchical-relationship data.

The disclosed solution constructs a space-efficient graph-based representation of a hierarchical address database, for example, as a cascading transitive-closure sequence-catalog alignment graph (referred to more simply as the "address graph"). The address graph reduces data storage redundancy by including separate graph trees for different address components and by generating links between these trees that reflect the hierarchical nature of the address components. Address components include, for example, building-number, street descriptors, city, and state, and each can have its own tree that includes a cascading representation of the strings from individual addresses that belong to that component. The links between trees serve to create a continuous path from the first component of a particular address to the last component of that particular address for each address in the database. A transitive closure step in the search process can prevent including results generated from bogus paths (e.g., paths that, if followed through the trees, would produce an invalid address). The links can also include flags to compensate for certain components that vary in position in the address component hierarchy, for example, unit-level descriptors. For example, such flags can be set to an initial value that allows entry into the unit-level graph tree during an alignment search. The flag can be reconfigurable to a different value after entry into the unit-level graph tree, such that the different value forbids re-entry into the unit-level graph tree.

Consider FIG. 1 as an example of a sequence-catalog alignment tree 100 similar to the graph tree that is generated a particular address component, here presented in the context of several animal names. The sequence-catalog alignment tree 100 encodes the character sequences for a set of sequences S. In this example, S includes the words cat, cattle, cow, dog, donkey, and duck, each of which is a string of characters. In the field of computing technology, a character is a unit of information that roughly corresponds to a grapheme (that is, the smallest unit of a writing system of any given language), grapheme-like unit, or symbol, such as in an alphabet or syllabary in the written form of a natural language. Examples of characters include letters, numerical digits, punctuation marks (such as "." or "-"), and whitespace. A string is a series of characters manipulated as a group, including for example, words and names as well as non-word and non-name character series (e.g., strings of numbers).

The sequence-catalog alignment tree 100 has a root vertex 105 and number of vertices 115 connected by edges 110. Each vertex 115 represents one character, and edges 115 connect vertices of adjacent characters in a string (e.g., an edge connects the d vertex to the o vertex, representing that "o" follows "d" in "donkey" or "dog"). Here, the root vertex 105 is shown with a dot-dash line to indicate that it does not represent a character in the sequence, but rather acts as a unifying vertex with branches leading into the first characters of all of the sequences encoded in the tree 100. Paths that follow the edges from vertex to vertex are referred to as branches. This graph tree structure, referred to as an arborescence, is a directed graph in which, for the root vertex u 105 and any other vertex v of the vertices 115, there is exactly one directed path from u to v. This graph tree structure is also a directed a acyclic graph in that it has a finite number of vertices and edges with each edge directed from one vertex to another, such that there is no way to start at any vertex v and follow a consistently-directed sequence of edges that eventually loops back to v again.

The terminal vertices 120 are a type of the vertices 115 that mark the terminal characters of sequences in the sequence-catalog. These are shown in FIG. 1 with dotted lines for the purpose of visually distinguishing the terminal vertices 120 from others of the vertices 115. As shown by terminal vertex 120 for "cat," some terminal vertices may be in the middle of paths leading to the terminal vertex of a longer string (here, the first "t" in "cattle"). Other terminal vertices 120 are also leaf vertices 125, which means that they are connected to only one edge 115 (e.g., the "e" in cattle). The string corresponding to the path leading from the root vertex 105 to a terminal vertex 120 is shown adjacent to that terminal vertex for purposes of illustration, and is also shown by following the characters in the vertices 115 along the path. In practice, each terminal vertex 120 can be associated with a unique identifier for the string that corresponds to the path from u to v. These strings can be looked up in a string database using these unique identifiers.

As illustrated in FIG. 1, a sequence-catalog alignment tree 100 encodes the characters in the sequences as branches in the tree 100, where branches are vertices 115 that follow paths of the edges 110. Sequences that overlap (e.g., the first two letters of "dog" and the first two letters of "donkey") follow the same path along a branch, and where those sequences diverge the branch also diverges into smaller branches (e.g., the "g" of "dog" represents a new smaller branch, as does the "nkey" of "donkey").

The solution combines this space-efficient graph-based representation of hierarchical address databases with the execution of a state-space search algorithm in order to generate auto-complete and auto-correct suggestions. The state-space searched is the address graph. The state-space search algorithm computes sequence alignment between individual input sequences in a pairwise manner with each sequence in the address graph to identify a finite number of catalog sequences that are most similar to the input. Given a pair of character sequences $s_a$ and $s_b$, the computation of a "sequence alignment" between $s_a$ and $s_b$ is the computation of a sequence of edit operations that convert $s_a$ to $s_b$ such that the number of edit operations, or the sum of penalties associated with the edit operations, is minimized. The value generated by this minimization yields the "edit distance" between $s_a$ and $s_b$. The edit distance serves as a measure of the similarity between $s_a$ and $s_b$ that is leveraged by the presently described search techniques to generate auto-complete and auto-correct suggestions.

The presently described search techniques search through the address graph using iterative-deepening depth-first search of the state-space. Depth-first search is an algorithm for traversing or searching tree or graph data structures. Depth-first search starts at the root vertex and explores as far as possible along each branch before backtracking. The presently described iterative-deepening search algorithm executes instances of the depth-first search algorithm for increasing edit distance values, beginning at zero. Execution can continue until a result set of a certain size is generated or until the searched edit distance value reaches a threshold. This threshold may be based, for example, on the length of the user input string or of particular components (e.g., words or numeric sequences) of the input string. For auto-complete and auto-correct, these search techniques can be used to present the top n ranked results, where rank is determined by minimum edit-distance followed by lexicographic order. Minimum edit-distance refers to the smallest edit penalty value that enables a given sequence to match with the input.

An experimental evaluation demonstrates that a single-threaded JAVA® software implementation consistently achieves sub 10-millisecond latencies for a database with 11.7 million address entries represented by an estimated 4.2 billion unique character sequences. This enables the disclosed technology to deliver auto-populated address results to users in "real-time," that is, as the users are entering input strings without noticeable delay between the user entering a new character and the update of the auto-populate address results. The space-efficiency of the graph tree representation is underscored by the combined effective memory footprint of the solution not exceeding 2.0 GB, a figure that shrinks down to approximately 1.0 GB with use of external-memory for the storage of the address strings presented to the user at the end of the search.

Although aspects of some embodiments described in the disclosure will focus, for the purpose of illustration, on particular examples of database strings including addresses, the examples are illustrative only and are not intended to be limiting. In some embodiments, the techniques described herein may be applied to additional or alternative types of database entries, and/or to voice-input systems instead of or in addition to text input systems. Further, although certain examples are discussed in the context of implementation on a single, personal computing device to highlight certain benefits of the disclosed technology, it will be appreciated that the disclosed technology can also be implemented by a server that communicates auto-complete and auto-correct results with user devices over a network. Various aspects of the disclosure will now be described with regard to certain examples and embodiments, which are intended to illustrate but not limit the disclosure.

Overview of Example Catalog-Sequence Alignment Trees

For purposes of illustration, FIGS. 2 and 3 (described in more detail below) are each presented in the context of a limited catalog of six address strings. In practice, the disclosed address graphs and associated search techniques can be implemented for much larger address databases, for example, city-wide address databases, state-wide address databases, nation-wide address database, and multinational address databases. To give context to the scale of such databases relative to the examples of FIGS. 2 and 3, at present the United States Postal Service ("USPS") advertises that it delivers to more than 156 million addresses in every state, city and town in the country. Thus, it will be appreciated that the disclosed address graphs can be much larger (e.g., include many more vertices, paths, and tree jumps) than the illustrated examples.

Figure 2:
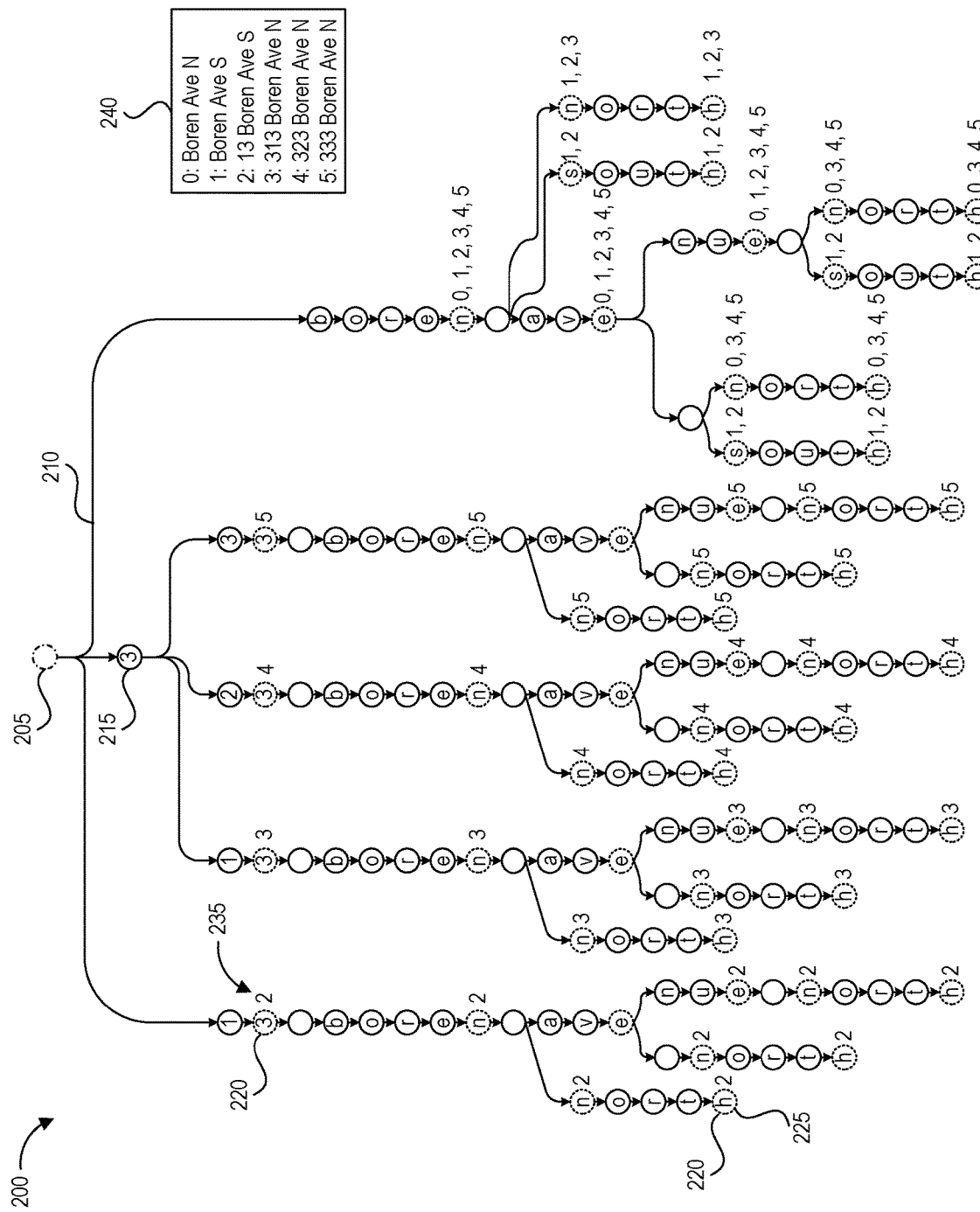
FIG. 2 illustrates an example sequence-catalog alignment tree for an address database including six addresses.

FIG. 2 illustrates an example sequence-catalog alignment tree 200 for an address database 240 including six addresses: Boren Ave N, Boren Ave S, 13 Boren Ave S, 313 Boren Ave N, 323 Boren Ave N, and 333 Boren Ave N. Similar to the tree of FIG. 1, each of these addresses is encoded into the tree 200 using single-character vertices 215, with edges 210 leading from root vertex 205 through the branches of each address string to the terminal vertex 220 of that address string. Terminal vertices 220 having only one edge 210 are considered as leaf vertices 225. Each address is assigned a unique numeric "address ID," shown in this example as 0 through 5. Each terminal vertex 220 features an address ID list 235, illustrated as the number or numbers adjacent to a terminal vertex 220. The address ID list 235 specifies the address ID values of the matching addresses. The address strings are listed with their associated address ID value in the database 240.

As will be appreciated, "N" is an alias of the street suffix "North" while "S" is an alias of the street suffix "South". To improve user experience, the tree 200 incorporates address-component aliases as well as partial address-definition aliases via the locations of its terminal vertices 220. Examples of address-component aliases include using "North" as an alias for "N" for street-direction prefix components, and/or using "First" as an alias for "1st" for street-name components. Examples of partial address-definition aliases include using "Boren Ave," "Boren N" and "Boren" as an alias for "Boren Ave N, Seattle, Wash."

The address databases encoded by the disclosed address graphs can be hierarchical address databases. A hierarchical address database consists of addresses defined by sequences of hierarchical address-components (referred to herein as "address definitions"). In the United States, for instance, the USPS defines addresses as sequences of hierarchical address-components that include: the building-number, the street-direction prefix, the street-name, the street-name suffix, the street-direction suffix, the unit-number prefix, the unit-number, the city, and the state. The underlying hierarchy places the state at the top, followed by the city, the street descriptor components, the building number, and, finally, the unit descriptor components.

The hierarchical rank of an address is determined by the lowest ranking component in the address definition. For example, the address "333 Boren Ave N, Seattle Wash." is a building-level address, while "Boren Ave N, Seattle Wash." is a street level address. The parent of an address is obtained by removing the lowest ranking component of the address definition. For example, the address "333 Boren Ave N, Seattle Wash., Suite 100" is a unit-level address that has "333 Boren Ave N, Seattle Wash." as a parent address and "Seattle Wash." as an ancestor address. A hierarchical address database is complete if it contains the entirety of the hierarchy, such that, for each address in the database, the database contains all ancestors and descendants of the address.

A limitation of the particular solution shown in FIG. 2 to representing an address database is the amount of space required to store the sequence-catalog alignment tree 200. As evident from the illustration of FIG. 2, virtually all otherwise common address-components (e.g., "north," "south"), as well as their aliases, are repeated verbatim as distinct paths in the tree 200 as many times as they are utilized in address definitions. Another limitation of the presented solution is that it does not strictly implement the hierarchical aspect of the address auto-correction and auto-completion process, which occurs when an exact match is not found, and thus, does present results in the correct order. Although this shortcoming can be remedied by modifying the executed instances of the depth-first search algorithm to favor paths with higher ranked minimum-rank address-components, the modification requires additional annotations of vertices at tree-generation time, thereby further aggravating the issue of the amount of hardware memory required to store the tree 200.

Figure 3:
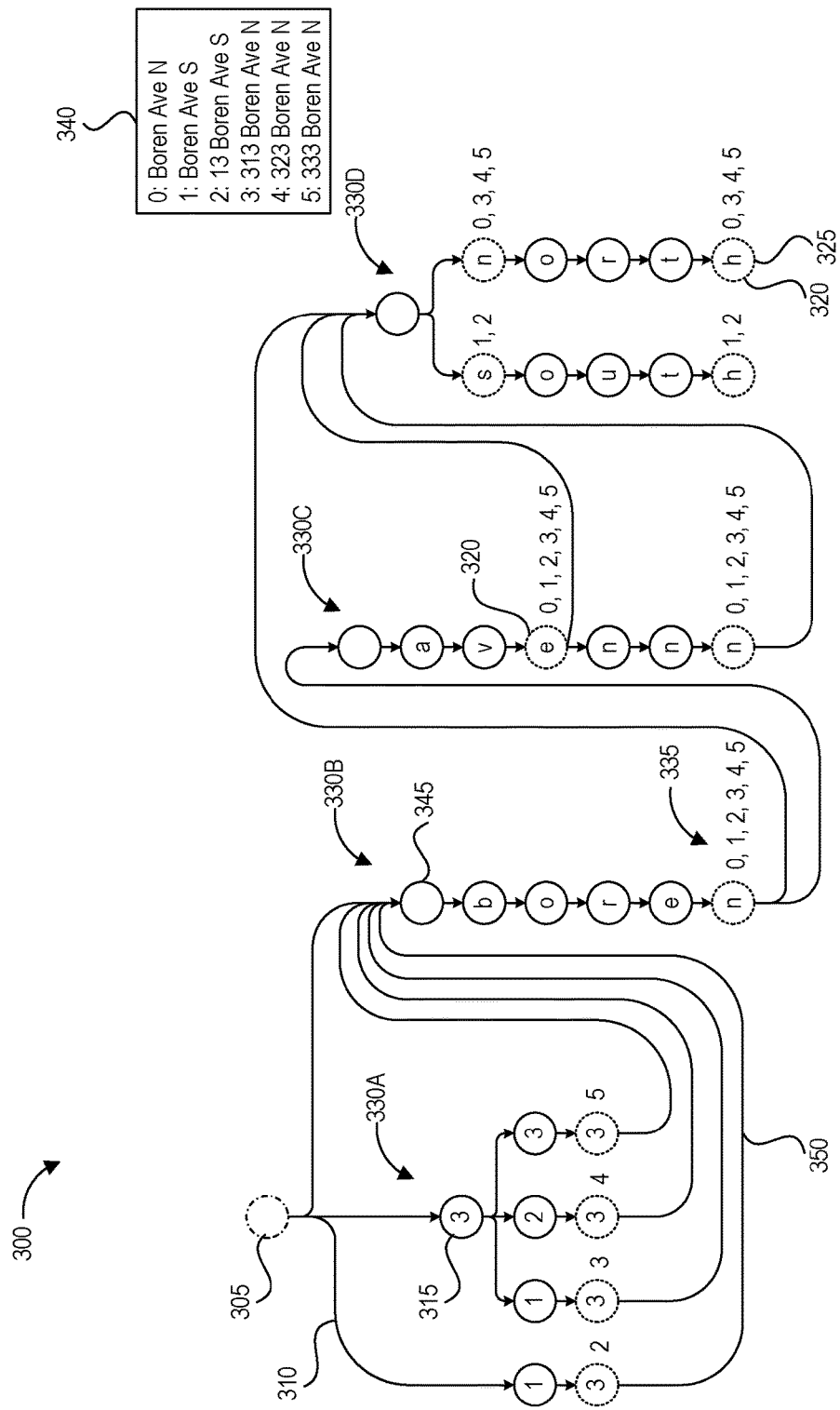
FIG. 3 illustrates an example more memory efficient, address graph representation of the sequence-catalog alignment tree illustrated in FIG. 2.

The present technology leverages the hierarchical nature of address databases to generate a more memory efficient, address graph representation of the sequence-catalog alignment tree 200, as illustrated by the address graph 300 of FIG. 3. This cascading transitive-closure sequence-catalog alignment graph, referred to more succinctly as an "address graph" 300, is a graph that represents the sequence-catalog alignment tree 200 in a much more memory-efficient manner.

Given a hierarchical address database, the disclosed techniques can construct a sequence-catalog alignment graph G such as the address graph 300 if the ordering of address-components in the definitions of all addresses in the database is transitive. In the address context, "transitive" refers to the following: an address definition has a component from address-component set A and a component from address-component set B, such that the component from A precedes the component from B in the definition. Then, for all address definitions in the database that feature a component from A and a component from B, the instance from A must precede the instance from B. Therefore, if "333 Boren Ave N" is in the database and "Ave" corresponds to the address-component of a street-name suffix, then, as a result, "333 Ave Boren N" cannot be in the database unless "Ave" is a member of an address-component set other than the street-name suffix set, e.g., "Ave" is a street-direction prefix.

In the address context and using an address graph 300, S may include all addresses in the database. Each address string can be separated into a number of address components, ordered based on a component hierarchy. The example address components depicted in FIG. 3 include building numbers (e.g., 13, 313, 323, and 333) street names (Boren), street-name suffixes (avenue), and street-direction suffixes (north, south). The building numbers are encoded in building number tree 330A, the street names are encoded as street name tree 330B, the street-name suffixes are encoded in street-name suffix tree 330C, and the street-direction suffixes are encoded as street-direction suffix tree 330D. In this manner, each component is represented by a separate tree, with that tree having branches that encode the character sequences of the strings associated with that component in the address definitions. Thus, the address graph 300 includes dedicated sequence-catalog alignment trees 330A-330D for each address-component set in the address database 340. Further, S can include aliases of address components, for example, "ave" for "avenue" and "n" for "north," and the terminal vertices 320 of the address graph 300 can account for such aliases. It should be noted that in this simplified example, the street name tree 330B, for example, only includes one street name (Boren) because the example database 340 only includes addresses on a single street. In practice, however, the street name tree 330B would likely include many branches each encoding the character sequences of a larger number of street names.

Edges 310 connect the root vertex 305 to the root vertex 345 of each root tree. A root tree is a tree that corresponds to an address-component set that has at least one member that is the leading component of at least one address definition in the database 340. In this example, the building number tree 330A and street name tree 330B represent the root trees. Similar to the trees 100, 200 described above, each tree 330A includes a number of vertices 315 connected by edges 310 with terminal vertices 320 representing the ends of strings (or their aliases), and leaf vertices 325 being a type of terminal vertex having only one edge. For the trees 330B-330D, the root vertex 345 represents a white space in the address string encoded in the graph tree, for example, the space separating adjacent address components. However, during alignment, some implementations of the disclosed techniques may actually clear white spaces such that they are ignored in the input. Other implementations may use the white spaces, but may collapse extraneous white spaces (e.g., tab or multiple spaces) into a single space. Some approaches further may not penalize spaces in input strings.

The trees 330A-330D are linked to each other through terminal-vertex to root-vertex arcs referred to as tree jumps 350, which represent a special type of edge that links the trees of sequential address components. Given a terminal vertex u in tree Ti, let Component(u) be the address component that u serves as the terminal vertex for in Ti. There exists a tree jump from a terminal vertex u of Ti to the root of Tj if and only if Tj contains a terminal vertex v such that, Component(v) follows Component(u) in the definition of one or more addresses in the database. The resulting graph is a directed and acyclic graph.

Each tree 330A-330D of the address graph 300 is a single-character Trie that encodes the sequences of S. A Trie is an ordered tree data structure that can be used to store strings of characters. As shown in FIG. 3, the vertices 315 in the tree each store only a single character and thus no vertex stores the entire string associated with that vertex; instead, its position in the tree defines the string with which it is associated. The associated strings for terminal vertices 320 are indicated by the address ID lists 335. All the descendants of a vertex 315 have a common prefix of the string associated with that vertex, and the root vertex 305 is associated with the empty string.

Not illustrated in FIG. 3 are trees for unit descriptor address-components: unit-number prefixes and unit-numbers. These address-components can shift place in the hierarchy, as shown by the following two example address strings: (1) 333 Boren Ave S, Suite 100, Seattle, WA, 98109, and (2) 333 #100 Boren Ave S, Seattle, WA, 98109. In the first example, the unit descriptors fall between the street-direction suffix and the city, while in the second example the unit descriptors fall between the building number and the street name. Thus, the unit descriptor trees would have tree jumps leading into their root vertices from the trees of other address-components in varying positions in the component hierarchy. During traversal of the address graph, these tree jumps could cause the erroneous inclusion of multiple unit descriptors along a given path. In order to accommodate this varying position while maintaining a directed and acyclic graph, the tree jump leading into a unit descriptor tree can include a flag or other indicator that allows one entry into the tree, but thereafter indicates that the unit descriptor tree is forbidden. As such, the present techniques can accommodate edge cases that otherwise violate the transitive closure property.

Another complication arises with postal-codes. In practice, postal codes are utilized by the USPS as delivery-route sortation codes that do not have a firm place within the hierarchy. For instance, a postal code can cover multiple cities, streets and buildings, but some cities, streets and buildings can have multiple postal codes. A complication also arises with Post-Office Box ("PO Box") addresses. In general, a PO Box address is a bottom-level address that combines a building-number (in this instance, the PO Box number) but lacks street-descriptors, despite being located in a building with a complete building-level address. In the present techniques, postal-codes are incorporated as part of address definitions and form a many-to-many relationship with bottom-level addresses, while the "PO Box" string is treated as a street-name in the case of PO Box addresses.

The disclosed version of the depth-first search algorithm can be used to compute alignment (e.g., a level of match) between input strings and character sequences encoded in the branches of the address graph 300. The execution of the depth-first search algorithm on the address graph 300 can be modified to include a transitive-closure step. To motivate the need for a transitive-closure step, consider the graph presented in FIG. 3 and the input string "333 Boren Avenue South." Observe that there exists a path in the graph having a sequence of characters that exactly matches the characters of this input, yet the address ID list of the final terminal vertex (the "h" of south) is associated with the address ID (2) that corresponds to "13 Boren Ave S." In other words, the path is "bogus." A bogus path follows the edges 310, vertices 315, and tree jumps 360 through the address graph 300 in a continuous manner that nevertheless results in an address not in the database 340.

The disclosed transitive-closure step of searching the address graph 300 eliminates bogus paths as follows. Let $P=v0, v1, \ldots, vn-1$ be a simple path in the graph, such that, v0 is a child of the root of a tree and vn−1 is a terminal vertex. P is not a bogus path if and only if the intersection of the address ID values of (i) vn−1, and of (ii) the address ID values of each vi in P that is both a terminal vertex and the origin of the tree jump to vi+1, is not-empty. In other words, the transitive-closure step can be implemented each time the search encounters a terminal vertex, and checks whether the address ID(s) of previous terminal vertices along the sequence branch are also associated with the present terminal vertex. If so, the sequence represented by the path is a valid address in the database 340, but if not, the path is a bogus path. The transitive-closure step can be computed at the end of each alignment, but, in practice, it can also be computed prior to each tree jump at the terminal vertex in order to prune bogus paths earlier in the search.

Overview of Example Catalog-Sequence Alignment System

Figure 4:
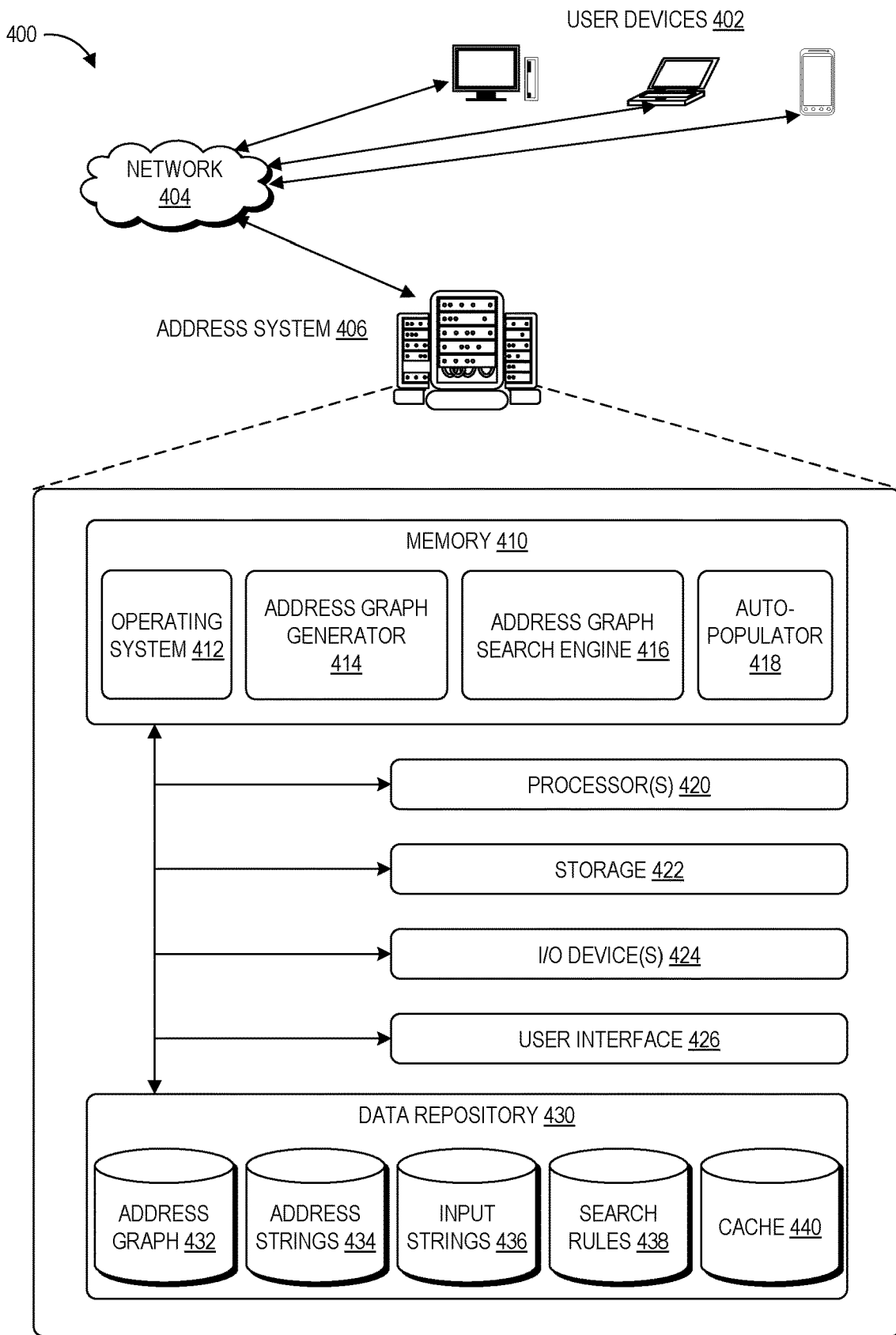
FIG. 4 is a block diagram of an illustrative computing system configured to generate and search address graphs, such as the address graph of FIG. 3.

FIG. 4 is a block diagram of an illustrative computing system 400 configured to generate and search address graphs, such as the address graph 300 of FIG. 3. As illustrated, the computing system 400 includes address system 406 and user devices 402 configured to communicate data with one another via network 404. The address system 400 can be used to generate and search address graphs as described herein.

In some embodiments, the address system 406 can be incorporated into a user device 402, and thus, no network 404 may be necessary. In some embodiments, a server-based address system 406 can generate an address graph as described herein and provide this graph to a user device 402 (or a number of user devices 402) over the network 404. Beneficially, this leverages the increased computing power of the server for generating an address graph, and the disclosed address graphs are memory efficient enough to be provided to and stored by a user computing device 402. In this example, the user computing device 402 may include the address graph search engine 416, auto-populator 418, and data repository 430 components that are illustrated as part of the address system 406. In some embodiments, the server-based address system 406 can both generate and search an address graph as described herein based on input transmitted from a user device 402 over the network 404, and can return auto-populate results to the user device 402 over the network 404. Thus, several distributed and non-distributed computing environments are suitable for the disclosed techniques.

The address system 406 includes at least one memory 410 and one or more processing units (or processor(s)) 420. The memory 410 may include more than one memory and may be distributed throughout the address system 406. The memory 410 may store program instructions that are loadable and executable on the processor(s) 420 as well as data generated during the execution of these programs. Depending on the configuration and type of memory, the memory 410 may be volatile (such as random access memory ("RAM")) and/or non-volatile (such as read-only memory ("ROM"), flash memory, or other memory). In some examples, the memory 410 may include multiple different types of memory, such as static random access memory ("SRAM"), dynamic random access memory ("DRAM"), or ROM.

The memory 410 can store the program instructions as a number of modules that configure processor(s) 420 to perform the various functions described herein, for example, operating system 412 for interacting with the computing system 400, as well as the address graph generator 414, address graph search engine 416, and auto-populator 418. These components can be in direct communication with one another or distributed among computing devices within a networked computing system and in communication with each other. The address graph generator 414 can execute the process 500 described with respect to FIG. 5 to generate an address graph similar to the example of FIG. 3. The address graph search engine 416 and auto-populator 418 can cooperate to perform the searching and user interface updating features of the process 600A described with respect to FIG. 6A.

The processor(s) 420 can include one or more general purpose computers, dedicated microprocessors, graphics processors, or other processing devices capable of communicating electronic information. Examples of the processor(s) 420 include one or more application-specific integrated circuits ("ASICs"), graphical processing units ("GPUs"), field programmable gate arrays ("FPGAs"), digital signal processors ("DSPs") and any other suitable specific or general purpose processors. The processor(s) 420 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the address system 406 may also include additional storage 422, which may include removable storage and/or non-removable storage. The additional storage 422 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 410 and the additional storage 422, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The address system 406 may also include input/output ("I/O") device(s) and/or ports 424, such as for enabling connection with a keyboard, a mouse, a pen, a voice input device, a touch input device, a display, speakers, a printer, or other I/O device. This can be used by a user to input the disclosed address strings. The address system 406 may also include a user interface 426. The user interface 426 may be displayed on the user device 402 and utilized by a user to input address strings, and may be utilized by the system to display the results of a catalog-sequence alignment search as described herein (e.g., via auto-correct and/or auto-complete). In some examples, the user interface 426 may include a graphical user interface, web-based applications, programmatic interfaces such as application programming interfaces ("APIs"), or other user interface configurations. In some embodiments, the I/O device(s) and/or ports 424 and user interface 426 can be part of a user computing device 402 accessing the address system 406 via network 404.

The address system 406 also includes a data store 430. In some examples, the data store 430 may include one or more data stores, databases, data structures, or the like for storing and/or retaining information associated with the computing system 400. Thus, the data store 430 may include data structures including address graph data repository 432, address sequences data repository 434, input strings data repository 436, search rules data repository 438, and cache 440. The address graph data repository 432 can store an address graph generated based on a hierarchical address database, for example, graph 300. The address strings data repository 434 can store the address strings of the hierarchical address database (the address definitions) as well as the unique IDs of each and any aliases. The input strings data repository 436 can store data representing the input strings provided by a user when entering an address, for example, into a map search, delivery address form, or the like. The search rules data repository 438 can store rules for searching an address graph. As described in more detail below with respect to FIG. 6A, these rules can relate to a maximum edit distance value, edit operations and associated penalties, a tree search order specifying an order in which trees are traversed, and how/when to implement a transitive closure step, among other things. Beneficially, searching an address graph according to the disclosed rules presents a user with intuitive results (e.g., results that logically match input strings) by eliminating bogus paths through a transitive closure step, as described in more detail with respect to FIG. 6A.

Figure 6A:
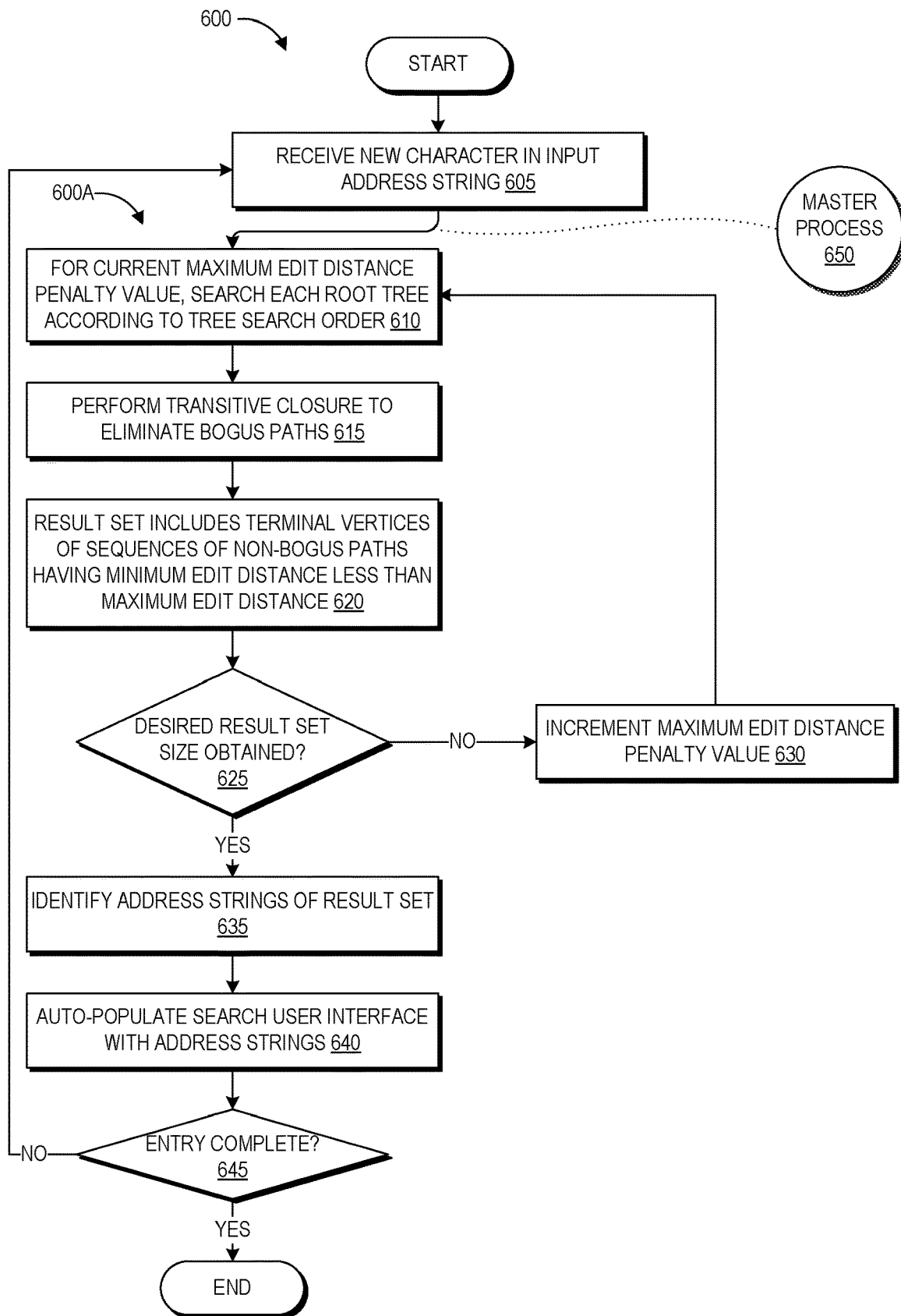
FIGS. 6A and 6B depict flowcharts of an example process for searching the address graph of FIG. 3 using the computing system of FIG. 4 in order to auto-populate address searches.
Figure 6B:
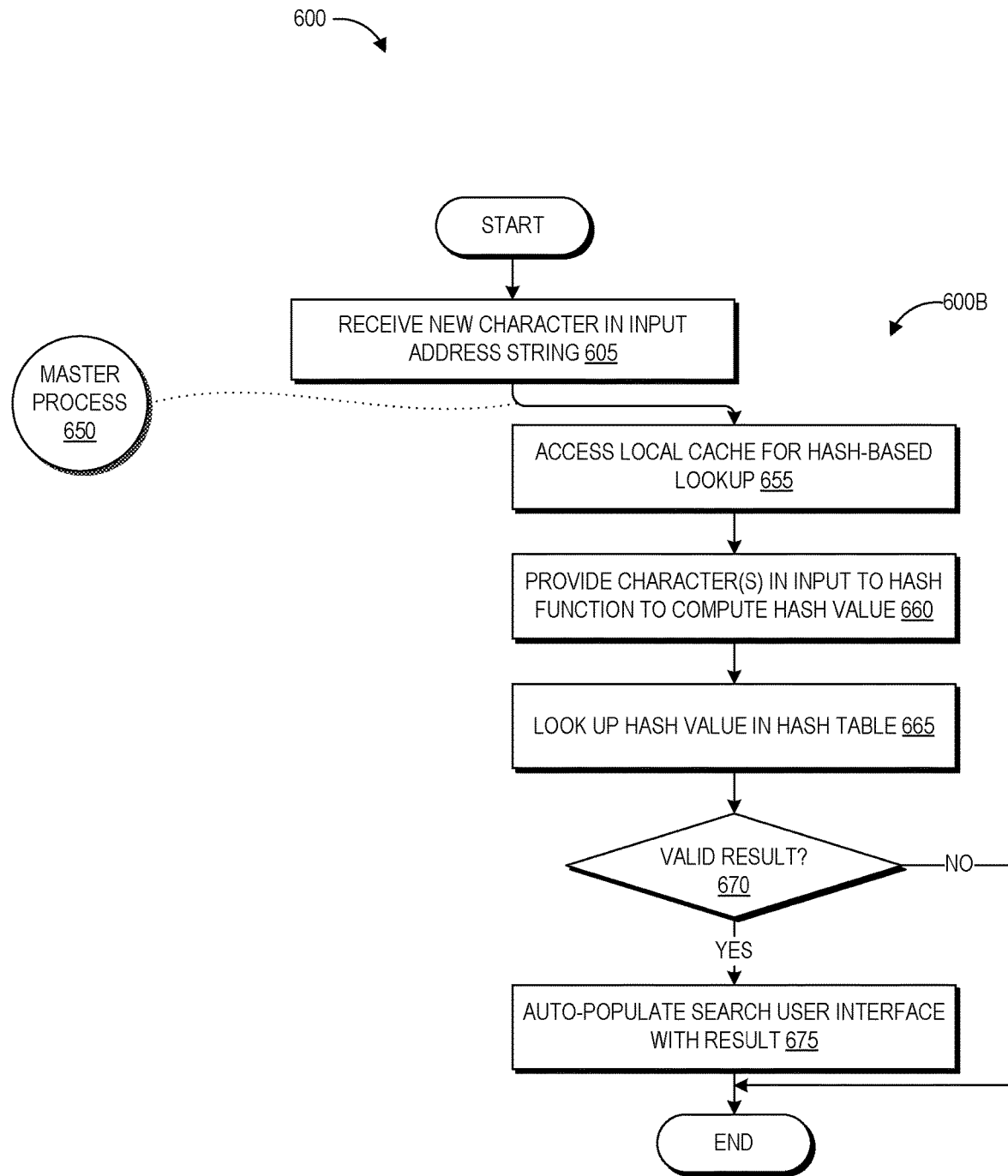

The cache 440, as described in more detail with respect to FIG. 6B, stores a number of associations between input address strings and the address strings in the hierarchical database. The cache 440 may be a single cache associated with the hierarchical database, or can include a number of geospatially distributed caches. Geospatially distributed caches refer to caches that are seeded specifically for different geographic regions, and which may reside in physical data storage devices distributed over such geographic regions in order to reduce latency in network communications between user devices in those regions and the caches. In some implementations, the cache 440 can be pre-seeded by the address graph search engine 416 (i) running through all character permutations within a certain limit (for example, 8 characters), optionally skipping odd characters (e.g., &, ˆ, and other symbols not commonly occurring in addresses), (ii) running through the search 600A described below to compute alignments between these character permutations and the address graph, and (iii) pre-seeding the cache 440 with these results. The cache 440 can be populated in some implementations using previously computed alignments between input address strings and the strings encoded in the address graph. The associations in the cache 440 can represent all previously computed alignments, a certain number or timeframe of recently computed alignments, or historically or predicted popular address inputs. With respect to historically popular address inputs, for example, the cache may be seeded with addresses commonly searched across a population of users, for example, users within a certain geographic region in the geospatially distributed cache embodiment. With respect to predicted popular address inputs, for example, if a large event is occurring in a certain region on a certain day, the geospatially-specific cache for that region can be pre-seeded for that day with associations between input strings that match the address of the event and the identifier of that address in the address database. Thus, the cache 440 may be dynamic to reflect trends and predictions regarding popular address inputs.

The network 404 can include any appropriate network, including an intranet, the Internet, a cellular network, a local area network or any other such network or combination thereof. For example, network 404 may be a publicly accessible network of linked networks, possibly operated by various distinct parties, such as the Internet. In other embodiments, the network 404 may include a private network, personal area network, local area network, wide area network, cable network, satellite network, cellular telephone network, etc. or a combination thereof, some or all of which may or may not have access to and/or from the Internet.

User devices 402 can include any network-equipped computing device, for example, desktop computers, laptops, smartphones, tablets, e-readers, gaming consoles, smart jewelry/accessories, and the like. Users can access the address system 406 via the network 404 and can be provided with auto-populated addresses via the network 404.

Overview of Example Tree Construction and State-Based Search Techniques

Figure 5:
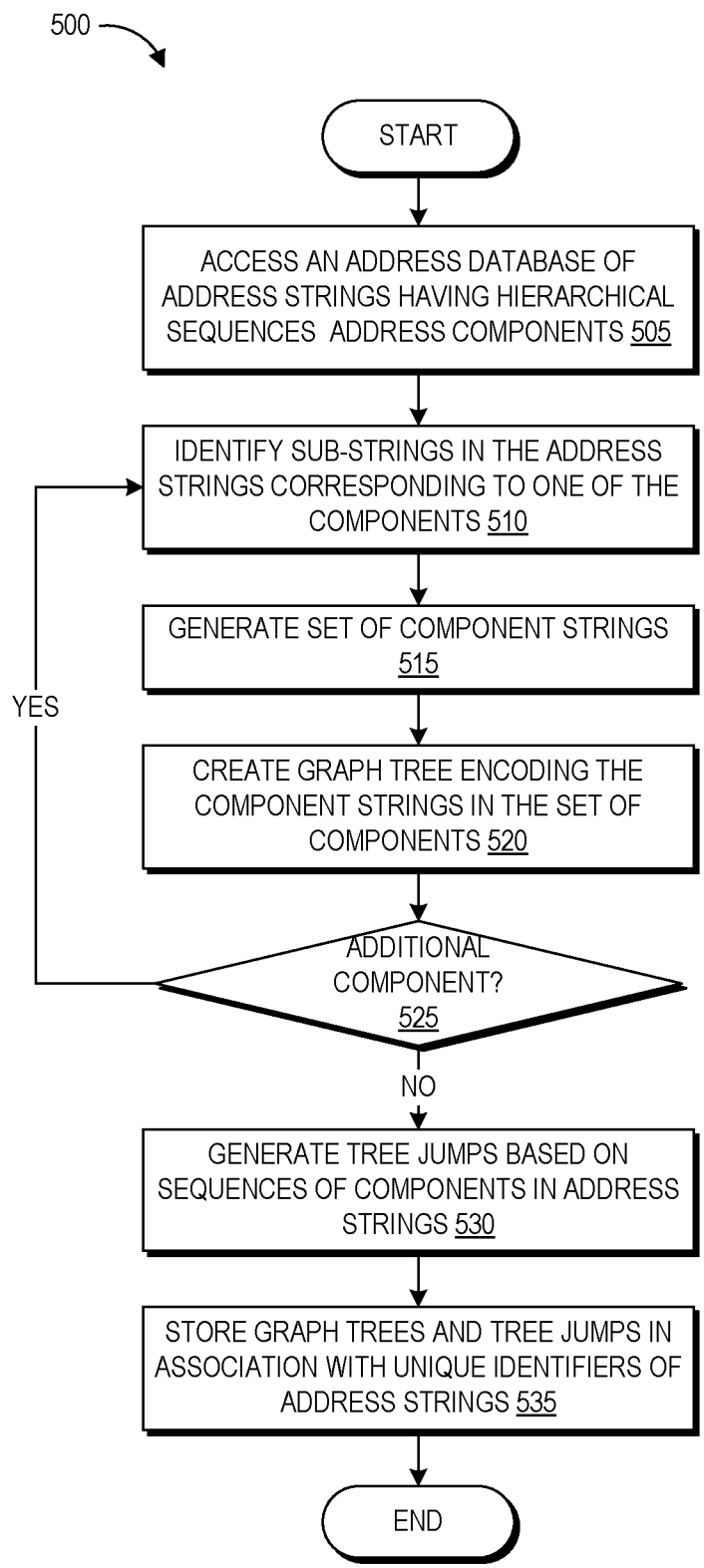
FIG. 5 depicts a flowchart of an example process for generating the address graph of FIG. 3 using the computing system of FIG. 4.

FIG. 5 depicts a flowchart of an example process 500 for generating an address graph, for example, the address graph 300 of FIG. 3, using the computing system 400 of FIG. 4. Typically, generating a tree 200 as shown in FIG. 2 involves a bottom-up approach that would first number all addresses and their aliases, and then construct the tree 200 to represent these addresses and aliases. However, this approach is slow and generates large, memory-intensive data structure. In contrast, the process 500 can be considered as a top-down approach that encodes separate trees of smaller sub-strings for each address component, rather than encoding many longer strings representing all address possibilities.

The process 500 may begin in response to an event, such periodically, when a new address database is received, when an updated address database is received, or on demand as determined by a system administrator. In some embodiments, the process 500 can begin for maintenance of an existing address graph. Maintenance can involve regular (e.g., quarterly) regeneration of data-structures in response to postal-authority dataset updates. When the process 500 is initiated, a set of executable program instructions stored on one or more non-transitory computer-readable media (e.g., hard drive, flash memory, removable media, etc.) may be loaded into memory (e.g., RAM) of a server or other computing device of the computing system 400. The executable instructions may then be executed by a hardware-based computer processor (e.g., a central processing unit or "CPU") of the computing device. In some embodiments, the process 600A or portions thereof may be implemented on multiple computing devices and/or multiple processors, serially or in parallel.

At block 505, the address graph generator 414 can access an address database of address strings having hierarchical sequences of different address components. As described herein, these components can include, for example, building number, street-direction prefix, street name, street-name suffix, street-direction suffix, unit-number prefix, unit-number, city, and state. The underlying hierarchy places the state at the top, followed by the city, the street descriptor components, the building number, and, finally, the unit descriptor components.

At block 510, the address graph generator 414 can identify sub-strings in the address strings corresponding to one of the components ("component strings"). The first iteration of block 505 may start with the first component in the hierarchy and proceed individually through each component after looping back from block 525 until all components have been covered. To illustrate, consider the following two addresses: 333 Boren Avenue, and 3717 South Angeline Street. For the building number component, the address graph generator 414 can identify the component strings "333" and "3717." In some embodiments, the component strings can be identified based on metadata associated with the address strings. In some embodiments, the component strings can be identified using machine learning approaches that recognize which strings correspond to which components, for example, by analyzing component strings that occur between white spaces.

As block 510 is being executed to identify the component strings, the address graph generator 414 can implement block 515 to generate a set S of the strings for a particular address component. The set S represents the strings from each of the addresses in the database that correspond to the address component. For some address components, each string in the database may include a sub-string corresponding to that component. For other address components, only some strings in the database may include a sub-string corresponding to that component.

At block 520, the address graph generator 414 can use the set S to build a graph tree for a particular component. The address graph generator 414 can insert the strings of a component into the tree for that component by inserting every character of an input string as an individual vertex. This insertion technique shares vertices among strings that have common prefixes (see, e.g., the first two letters of "dog" and "donkey" in the example FIG. 1). Insertion can further include marking vertices corresponding to the end of a string, or to a location within a string marking the end of an alias of the string, as terminal vertices, and associating address IDs with the terminal vertices. The length of the longest string determines the depth of a given tree.

At block 525, the address graph generator 414 can determine whether there are additional components in the hierarchy. If so, the process 500 loops back to block 510 to identify the sub-strings of an address string representing the character strings for the next component. Returning to the two example address provided at step 510, for the street-direction prefix component, the address graph generator 414 can identify the component string "South." For the street name component, the address graph generator 414 can identify the component strings "Boren" and "Angeline." For the street-name suffix component, the address graph generator 414 can identify the component strings "Avenue" and "Street." As the process 500 loops through blocks 510-525, separate sets S of the strings can be generated for each component, with the graph tree for each component generated based on its corresponding set S. If not, then all of the components have been encoded as trees, and the process 500 transitions to block 530.

At block 530, the address graph generator 414 can generate tree jumps based on the component hierarchy and the actual sequences of components in the address strings. For a given terminal vertex u in tree Ti, let Component(u) be the address component that u serves as the terminal vertex for in Ti. The address graph generator 414 can create a tree jump from a terminal vertex u of Ti to the root of Tj if and only if Tj contains a terminal vertex v such that, Component(v) follows Component(u) in the definition of one or more addresses in the database. For unit descriptor trees and other trees representing variable positioning components that do not strictly follow the hierarchy, the tree jumps can include a flag that can be set to a particular value in order to prevent invalid address sequences from being generated when the tree is traversed during searching.

At block 535, the address graph generator 414 can store the graph trees and tree jumps as an address graph. Further, the address graph generator 414 can store the address graph with data indicating particular terminal vertices that are associated with address ID lists. In some embodiments, the address graph generator 414 can additionally store the address database having the address strings and their associated address IDs in association with the graph tree. In other embodiments, the address database can be stored separately for access together with the address graph during a search.

One example of the process 500 can be implemented as a hierarchical address-database generation process that generates databases based on the USPS carrier-route and city-state datasets. Because the carrier-route dataset lists primary and secondary-address ranges, as opposed to distinct bottom-level addresses, the address graph generator 414 can enumerating all possible primary- and secondary-address values defined by the ranges. The city-state compliments the carrier-route set by providing city name and alternate city name mappings.

The process 500 can also seed the graph with each address in the database along with all possible variations of the address resulting from the application of address-component aliases and partial address-definition aliases.

FIG. 6A depicts a flowchart of a first sub-process 600A of an example process 600. The process 600 can be used in order to auto-populate address searches and/or entries, for example, using address auto-correction and/or auto-completion. The sub-process 600A can be used for searching the address graph of FIG. 3 using the computing system 400 of FIG. 4. Address auto-correction and auto-completion against a hierarchical address-database involves the sub-process 600A of generating a finite number of addresses that are deemed as most relevant to an input string. In addition, this sub-process 600A can present the identified addresses in an order that reflects their relevance. The sub-process 600A can be considered as a cascading transitive-closure state-space search sequence-catalog alignment algorithm.

Before describing the process 600, it should be understood that the described form of sequence alignment is referred to as the pairwise-sequence alignment problem. When three or more sequences are involved, the computation is referred to as the multiple-sequence alignment problem. The techniques of the present disclosure relate a variant of the multiple-sequence alignment problem where individual input-sequences are aligned in a pairwise manner with each sequence in a sequence catalog to identify a finite number of catalog sequences that are most similar to the input, with the provision that in each computation the input sequence changes while the catalog remains fixed. This is referred to herein as the sequence-catalog alignment problem. The sub-process 600A presents a solution to the sequence-catalog alignment problem.

The sub-process 600A from start to end represents an instance of an iterative depth-first search algorithm for computing alignment between input strings and the sequences encoded in the address graph. When executing the iterative-deepening depth-first search algorithm on the tree of the address graph, each executed instance of the depth-first search algorithm terminates early when the number unique address ID values of the recorded vertices in the result set is greater-than or equal-to n, as opposed to terminating early when the number of recorded vertices in the result set reaches n. When an instance of the depth-first search algorithm terminates with a non-empty result set, the addresses corresponding to the address ID values of the recorded vertices are ordered based on their hierarchical and lexicographic rank. The generation of the longest-common prefix method result set is achieved through the execution of the depth-first search algorithm with a $d_{max}$ value of zero. During the search process 500, a single path of the address graph is explored that corresponds to the prefix of the input (e.g., the first characters or component). The last vertex on the path is the root of a sub-tree whose terminal vertices correspond to all longest-common prefix matches. A subsequent lexicographically ordered traversal of the sub-tree allows for the generation of the result set.

The sequence-catalog alignment problem can be expressed as a state-space search problem. In the disclosed formulation, the search space is a function of the sequence-catalog alignment tree (e.g., the address graph 300). Given a set of sequences S, the sequence-catalog alignment tree T of S is an instance of the single-character Trie that encodes the sequences of S. Given T and an input sequence s, the search space consists of states defined by (v, p, d), where v is a vertex along a path from the root to v, p is the zero-index based position in s, and d is the current accumulation of edit penalties.

The process 600 may begin in response to an event, such as upon entry of an input string (or a new character of the input) by a user. When the process 600 is initiated, a set of executable program instructions stored on one or more non-transitory computer-readable media (e.g., hard drive, flash memory, removable media, etc.) may be loaded into memory (e.g., RAM) of a server or other computing device of the computing system 400. The executable instructions may then be executed by a hardware-based computer processor (e.g., a CPU) of the computing device. In some embodiments, the process 600 or portions thereof may be implemented on multiple computing devices and/or multiple processors, serially or in parallel.

At block 605, the computing system 400 receives a new character in an input address string, for example, via the input device 424 and user interface 426. This can be the first input character or a subsequent character. In some embodiments, each time the user inputs a new character, the process 600 can loop back to block 605 to re-compute alignment between the input string and the address graph (or cache, as explained more with respect to FIG. 6B). As such, though not illustrated, process 600 can include a block that monitors user entries in the address field and loops back to block 605 when a new character is entered. The address field can be a text input field in a computer-based user interface, for example, incorporated into a map service, a user information form (e.g., billing and shipping addresses), and the like.

From block 605, the process 600 transitions into the sub-process 600A. The process 600 also transitions in parallel to sub-process 600B shown in FIG. 6B. Though the sub-processes 600A and 600B represent alternate, parallel branches of the same overall process 600, they are illustrated separately for clarity of the drawings. Transitioning into the sub-processes 600A and 600B also triggers master process 650 to observe both sub-processes. The master process 650 determines which of the sub-processes 600A, 600B returns results first, and terminates the other of the sub-processes 600A, 600B.

At block 610 of the sub-process 600A, the address graph search engine 416 can search each root tree according to a specified tree search order, as described in detail below. This search is executed according to the currently set maximum edit distance ("$d_{max}$"). The maximum edit distance represents the largest allowable penalty resulting from edit operations that still results in a valid match between the input and a sequence encoded in the address graph. The sub-process 600A can start with the smallest possible edit distance (e.g., zero, representing a perfect match without edits) and iteratively increase this distance if the desired number of addresses are not reflected in the search result set.

Thus, as the address graph search engine 416 traverses the address graph to compute alignment with the input sequence, the address graph search engine 416 can compute the edit distance between the input and a given sequence encoded in the address graph reflected by the currently analyzed vertex (e.g., the character string encoded by the vertices along the branch leading from the root vertex to that vertex). This can also involve the address graph search engine 416 determining which edit operations, if any, bring the input string into alignment with a given sequence.

Various implementations can allow one or more of at least three edit operations: insert, delete and swap. For example, the word "Seattle" can be converted to "Battle" by swapping "S" with "B" and deleting "e," while, conversely, "Battle" can be converted to "Seattle" by swapping "B" with "S" and inserting "e." Each edit operation can have an associated penalty, and the sum of these penalties represents the edit distance d between the input and a given sequence encoded in the address graph.

Edit operations can have penalties that are either uniform or non-uniform. Non-uniform penalty schemes allow the edit distance to capture real-life processes, such as common keyboard data-entry typos and/or spelling mistakes. Examples of non-uniform penalty schemes include (i) the use of pairwise-character penalty matrices for swap operations; (ii) the detection of successive insertion or deletions operations to scale insertion and deletion penalties; (iii) the detection of character transpositions to scale swap penalties (e.g., "Fifth" and "Fifht" could have a reduced penalty as this is a common typographical error); and (iv) the detection missing or extraneous characters to scale insertion and deletions operation penalties (e.g., the insertion of "t" in the conversion of "Seatle" to "Seattle" prior to the existing "t" could have a reduced penalty).

The sub-process 600A works by executing a modified version of the iterative-deepening depth-first search algorithm at the root 335 of each root tree of the graph. As described above, a root tree is a tree that corresponds to an address-component set that has at least one member that is the leading component of at least one address definition in the database. For each value of $d_{max}$, the depth-first search algorithm is executed at each root tree prior to moving onto the next $d_{max}$ value. The ordering of the root trees is consistent at each $d_{max}$ value and is referred to as the tree search-order. If the current instance of depth-first search produces a non-empty result set, we terminate with that result set. In the event that neither of the executed instances of the algorithm produce a non-empty result set up to and including the maximum $d_{max}$ value, the longest the longest-common prefix method is applied by way of executing the depth-first search algorithm with a $d_{max}$ value of zero at each root tree. In the event of a tie for the length of the longest-common prefix between the root trees, the sub-process 600A can terminate with the result set of the root tree that is nearest to the front of the tree search order.

The tree search-order enables the strict implementation of the hierarchical aspect of the address auto-correction and auto-completion process. For example, consider that the address graph features trees for building-number, street-name, city, and state address-component sets. In this scenario, defining the tree search-order as state, city, building-number, and street-name ensures that the result set adheres to the definition of the address auto-correction and auto-completion process.

For the root state $\alpha=(u, 0, 0)$, where u is the root vertex, the set of successor states of a consists of a state $\beta=(v, 0, 0)$ for each vertex v that is a child of u. For a non-root state $\alpha=(u, p, d)$, where u is a non-root vertex, the set of successor states of a consists of: (i) a state $\beta=(v, p+1, d+\text{SwapCost}(s_p, \text{Character}(u)))$ for each vertex v that is a child of u; (ii) the state $\beta=(u, p+1, d+\text{InsertCost}( ))$; and (iii) a state $\beta=(v, p, d+\text{DeleteCost}( ))$ for each vertex v that is a child vertex u.

To enable the recovery of the sequence of edit operations that was performed to reach the current state from the root state, a process referred to as "path recovery," the address graph search engine 416 can augment the state representation with a pointer to the predecessor state and the corresponding edit operation. Path recovery, whether partial or total, allows for various user-interface visual-feedback mechanisms (e.g., auto-populate mechanisms including auto-correct, auto-complete, and suggestion display), while also allowing for the application of non-uniform penalty schemes that are contextual, e.g., transposition detection.

Thus, at block 610, the address graph search engine 416 can implement a modified version of depth-first search by starting at the root and advancing along each branch of each root tree character by character (e.g., vertex by vertex), using tree jumps to travel to the trees of subsequent address-components. For each sequence encoded in the address graph 300, the address graph search engine 416 can continue along the path corresponding to that sequence until reaching a terminal vertex or accumulating an edit penalty greater than $d_{max}$. This can be done until a result set of a predetermined size is generated. The depth-first search algorithm can be modified as described herein to compute all sequences whose minimum edit-distance relative to s is less-than or equal-to $d_{max}$. The modification involves maintaining a result set consisting of terminal vertices and distance values.

Specifically, the search begins with the root state being pushed onto a stack. A stack is a function used to hold (e.g., maintain a record in computer memory) a list of visited vertices. While the stack is non-empty, the topmost state $\alpha=(u, p, d)$ is popped. "Popping" a vertex refers to removing the top-most vertex of the stack and selecting the next vertex to visit. If u is a terminal vertex, $p=|s|-1$, and $d<=d_{max}$ then u is recorded in the result-set at edit-distance d unless u is already recorded at a smaller edit-distance.

Next, $\alpha$ is expanded. For each generated state $\beta=(v, p', d')$, $\beta$ is pushed onto the stack if and only if $p'<=|s|-1$ and $d'<=d_{max}$. In instances where u is a leaf vertex (which automatically makes it a terminal vertex) and $p<|s|-1$, u is recorded at distance d' if $d'<=d_{max}$, where $d'=d+\text{SwapCost}(s_p, \text{Character}(u))+(|s|-p-1)\text{InsertCost}( )$ unless u is already recorded at a smaller edit-distance.

At block 615, the address graph search engine 416 can perform a transitive-closure step to eliminate bogus paths. For example, as described above let P=v0, v1, . . . , vn−1 be a path in the address graph 300 such that v0 is a child of the root of a tree and vn−1 is a terminal vertex. P is not a bogus path if and only if the intersection of the address ID values of (i) vn−1, and of (ii) the address ID values of each vi in P that is both a terminal vertex and the origin of the tree jump to vi+1, is not-empty. In other words, the transitive-closure step can be implemented each time the search encounters a terminal vertex, and checks whether the address ID(s) of previous terminal vertices along the sequence branch are also associated with the present terminal vertex. If so, the sequence represented by the path is a valid address in the database 340, but if not, the path is a bogus path. The transitive-closure step can be computed at the end of each alignment in some embodiments, e.g., when the address graph search engine 416 reaches a leaf vertex along a path. In other embodiments, the transitive-closure step can be computed prior to each tree jump at the terminal vertex in order to prune bogus paths earlier in the search.

At block 620, the result set includes the terminal vertices of sequences of non-bogus paths that have a minimum edit distance less than $d_{max}$. It should be noted that when the stack is empty (e.g., no vertices have been visited), the result set contains the terminal vertices of all sequences whose minimum edit-distance relative to s is less-than or equal-to $d_{max}$, with the recorded edit-distance being equal to the minimum-edit distance relative to s. The address graph search engine 416 can add results to the set when they satisfy the criteria described above.

At block 625, the address graph search engine 416 can determine whether the results set has reached a desired size. This size may be a fixed number (e.g., eight results) or can be dynamically determined based on properties of the display of the user device that will present the search results. In some embodiments, capping the search result set at k results enables the user to view only the most likely results for their input string.

If the answer at block 625 is no, the sub-process 600A transitions to block 630. At block 630, the address graph search engine 416 can increment the value of $d_{max}$. The value by which $d_{max}$ is increased can correspond to the smallest edit-operation penalty value. The sub-process 600A then loops back to block 610 to re-perform blocks 610-625 using the new value of $d_{max}$. Executions can proceed until the result set reaches the predetermined size, until a non-empty result set is generated, or $d_{max}$ exceeds a certain maximum threshold.

In some embodiments, it can be beneficial to establish a maximum threshold on the value of $d_{max}$, whether on a per address-component basis or on the entire address string. The maximum threshold can be set such that, if there are no addresses whose minimum-edit distance is less-than or equal-to the maximum, the output consists of a finite number of the highest ranking addresses that have the longest-common prefix relative to the input. In one example, for each level of the address hierarchy, the address graph search engine 416 can compute the length of the longest-common prefix of any address in the level. Let L be the level with the longest-common prefix length, such that, in the event of a tie between multiple levels, L is the highest in the hierarchy. The address graph search engine 416 can generate the output as the leading k addresses of the lexicographically ordered list of addresses with the longest-common prefix, followed by the leading max(0, k-l) addresses of the hierarchically and lexicographically ordered list of descendants of the longest-common prefix addresses, where l is the actual number of longest-common prefix addresses. The described longest-common prefix method is also applicable in instances when the length of the user input is equal to length of the longest-matching prefix even when an exact match is possible. For example, if the user input is "bar" and the address database consists of "far" and "barren," then, arguably, "barren" should be presented in favor of "far," at least until the input is "bar," in which case "far" is more intuitive due to the existence of the space character at the end of the input. Thus, the $d_{max}$ maximum threshold can be determined based on the number of characters in the longest-entered component entered by the user. In this manner, longer strings for address components would yield higher $d_{max}$ maximum threshold values, while shorter strings for address components would yield lower $d_{max}$ maximum threshold values.

Once the desired result set has been generated, the sub-process 600A transitions to block 635. At block 635, the address graph search engine 416 can identify the address strings of the results set. For example, as indicated above the results set may indicate the terminal vertices of sequences of non-bogus paths that have a minimum edit distance less than $d_{max}$. At block 635, the address graph search engine 416 can look up the address ID lists associated with these terminal vertices and identify the appropriate address string(s) from the address ID lists. Optionally, block 635 can include the address graph search engine 416 re-ranking these addresses, for example, based on proximity to the location of an IP address or GPS location of the user device providing the input address string, or based on an address entry history of the user. Also optionally, block 635 can include saving the input string and associated result in the cache 440, for example in a single cache associated with the address graph, or in one of a number of geospatially-partitioned nodes that relates to a geographic region encompassing a location of the user device inputting the string.

At block 640, the auto-populator 418 can auto-populate the address entry user interface with the determined address strings. This can include displaying the address strings as user-selectable options that, when selected, populate the address entry field of the user interface. In other embodiments, this can include automatically correcting and/or completing the address entry field of the user interface, optionally together with a user-selectable option to cycle through the suggestions.

Where a list of suggested options are presented to the user as a result of the sub-process 600A, block 640 can also involve ranking the addresses reflected in the search result set. One example technique for ranking is as follows. Let k be the maximum number of addresses in the output. This value k represents the predetermined desired result set size, for example, 8 or another number. This number may be determined in advance, or determined dynamically based on parameters of the user device that is receiving the user input and will display the results of the sub-process 600A. These parameters can include the size and/or resolution of the screen (or projection) of the device, or of a portion of the screen (or projection) that will be used for displaying the result set.

For each level of the address hierarchy, the address system 406 can compute the minimum edit-distance of any address relative to the input. Let L be the level with the smallest minimum edit-distance, such that, in the event of a tie between multiple levels, L is at the highest level in the hierarchy. If the minimum edit-distance is zero, L contains one address that is an exact match for the input. In this scenario, the address graph search engine 416 can generate the output as the exact match address followed by the leading k−1 addresses of the hierarchy, with these addresses ranked first based on edit distance values and ranked lexicographically in the event of addresses having the same edit distance value. In some embodiments this list can be displayed (and ranked) together with a lexicographically-ordered list of the descendants of the exact match address. If the minimum edit-distance is greater than-zero, L contains one or more addresses that are approximate matches for the input. In this scenario, the address graph search engine 416 can generate the output as the leading k addresses of the lexicographically ordered list of approximate match addresses, followed by the leading max(0, k−l) addresses of the hierarchy, where l is the actual number of approximate match addresses. Some embodiments can additionally display a lexicographically ordered list of descendants of the approximate match addresses.

At block 645, the address graph search engine 416 can determine whether the entry is complete, for example, based on the user selecting one of the presented address suggestions, or the user moving their input indicator (e.g., a cursor or a touch screen input) to another portion of the user interface. If the entry is not complete, the sub-process 600A can loop back to block 605 upon entry of a new character in the input address strong. If the entry is complete, the sub-process 600A can terminate.

The modified depth-first search algorithm forms the basis of a modified iterative-deepening depth-first search algorithm that presents the top n ranked results, where rank is determined by minimum edit-distance followed by lexicographic order. The iterative-deepening algorithm executes instances of the depth-first search algorithm for increasing values of $d_{max}$ beginning at zero. Each execution features an increase to $d_{max}$ that corresponds to the smallest edit-operation penalty. Executions proceed until either a non-empty result set is generated or $d_{max}$ exceeds a certain threshold. A pair of modifications is applied to the depth-first search algorithm. First, generated states that advance the traversal in the sequence-catalog alignment tree, i.e., swaps and deletions but not inserts, are explored in lexicographic order. Second, the algorithm terminates early when the size of the result set reaches n.

One example can implement this sub-process 600A, which can be considered as an iterative-deepening depth-first search formulation of the cascading transitive-closure with state-space search sequence-catalog alignment algorithm. In one embodiment, the sub-process 600A may be implemented in the JAVA software platform. This particular example implementation features 32-bit character values for full UTF-8 character-set support, 32-bit address ID values, and depth-first search implementation techniques that include branch-and-bound cut-off tied to descendant path-lengths and a merge-based transitive closure step. "Branch-and-bound cut-off" refers to stopping an alignment search down a particular path when it is clear that continuing down the path will exhaust the budget (e.g., exceed the maximum edit distance). To illustrate, consider the scenario of searching down a path with one node left, three characters left in the input string, and an edit distance (budget) of one. Because continuing down the path while matching the input string will require two delete edit operations, this would exceed the budget, so rather than continue to the final node the search would terminate. "Merge-based transitive closure" refers to computing common elements between two sorted sequences of integers by merging the sequences and storing only the common elements. This can be done when the input exceeds a certain size, while under that size a binary search (e.g., iterating through the integers of one string while doing a binary search of the other string) can be implemented. This implementation also features an input pre-processing step wherein the input is stripped of excessive whitespace and is tokenized. The tokenized input serves as the basis of the application of $d_{max}$ values in the depth-first search algorithm. In particular, for a given value of $d_{max}$, the sub-process 600A maintains a local edit-distance and a global edit-distance. The local-edit distance is reset each time a tree jump takes place and the search has advanced to the next token since the last tree jump. With this configuration, capping $d_{max}$ at one was adequate for intuitive result-set generation when combined with the longest-common prefix method (a method that returns the longest common prefix of two or more strings).

FIG. 6B depicts a flowchart of a second sub-process 600B of the process 600. The sub-process 600B can be used to quickly retrieve previously-computed results of the process 600A from a hash table. In some implementations, retrieving a result from the hash table using process sub-600B may be faster than computing an alignment with the address graph using the sub-process 600A. For example, in the embodiment having different versions of the cache 440 stored at different geospatially distributed nodes, the particular associations stored in the hash table at one of the nodes can enable the sub-process 600B to produce results faster for that region than for other regions. Such caches 440 can also vary over time to capture temporal trends in address inputs.

The process 600 transitions into the sub-process 600B from block 605 in parallel with transitioning into sub-process 600A described above. As described above, the master process 650 also observes the sub-process 600B to determine which of the sub-processes 600A, 600B returns results first. The master process 650 terminates the other sub-process.

At block 655, the address graph search engine 416 can access a local cache 440 for hash-based lookup using the character(s) in the current input address string. A hash table, for example stored in cache 440, is a data structure which implements an associative array abstract data type, a structure that can map keys (the input address string) to values (the unique ID of an address string).

At block 660, the address graph search engine 416 can provide the character(s) in input to a hash function to compute a hash value. A hash table uses a hash function to compute an index into an array of buckets or slots, from which the desired value can be found. A hash function is any function that can be used to map data of arbitrary size to data of fixed size. The values returned by a hash function are called hash values. A hash value is a numeric value of a fixed length that uniquely identifies data.

At block 665, the address graph search engine 416 can look up the hash value in the hash table. Decision block 670 determines whether the look-up produces a valid result, that is, whether the value returned by the hash function is in the hash table. If so, the sub-process 600B transitions to block 675 to auto-populate the search user interface with the address string corresponding to the result of the hash table look-up. At this point, if the sub-process 600A is still being executed, the master process 650 would terminate it. If the look-up does not produce a valid result, the sub-process 600B ends.

Overview of Examples and User Interfaces

The below described examples relate to address graphs and suitable alignment searches that can be performed by the computing system 400, for example, using the processes 500 and/or 600A, 600B.

Memory Footprint

All results experimental presented in this section involve a graph generated from a database corresponding to an extract of King County in Washington, USA, a region with a population of 2.1 million. The database features 11.7 million addresses. By comparison, King County records contain 0.75 million building-level addresses, while other address models for the United States contain a total of 125 million building- and unit-level addresses. The resulting graph encodes around 4.2 billion unique character-sequences while consuming only 2.0 GB of memory. The memory footprint is trivially reduced by approximately half, e.g., down to 1.0 GB, by using external-memory, whether in the form of local disk-based and/or "cloud"-based storage (where "cloud" refers to a group of networked, rapidly provisioned computing devices that provide services, e.g., storage services, with little to no management by users and without the need for individual addressing), for storage of the address strings. With this approach, external-memory access is limited to the fetching of the k address-strings corresponding to the k address ID values generated at the conclusion of the search.

The space-consumption reductions afforded by the sequence-catalog graph representation over the sequence-catalog alignment tree are illustrated by a comparison for an address database consisting of 166 thousand addresses corresponding to an extract of the South Lake Union neighborhood of Seattle, Wash., USA. For this database, the sequence-catalog alignment tree representation (of the structure shown in FIG. 2) features 413 million vertices and a total of 180 million address-ID entries among 77 million terminal-vertices. By contrast, the cascading sequence-catalog alignment graph (of the structure shown in FIG. 3) features 26 thousand vertices and a total of 1.9 million address-id entries among 20 thousand terminal-vertices.

Performance

Assessment of the performance of this implementation used an interactive benchmarking process through a graphical-user interface featuring an input textbox. During interactive benchmarking, the wall-clock latency for generating a result set was observed in the 1 to 10 millisecond range on a desktop machine in the common case, while never exceeding 50 milliseconds. Additional benchmarking indicates that in the case of the longer latencies, between 25% and 95% of the computation time accounted for by the transitive closure step, with this portion being proportional to size of the database. The performance of this aspect of the implementation may be improved dramatically through the use of a lower-level implementation language. Although used for these experiments, the JAVA software platform may be a less than ideal choice for search algorithm implementation due to the overhead and restrictions imposed by the platform's managed-memory environment, whether in the form of array-index bounds checking or the lack of support for primitive-structure definitions. Additional benchmarking also indicates that performance on smaller databases scales proportionally relative to reductions in the database size.

This result is particularly encouraging for the parallelization of the solution, since the database can be partitioned into smaller disjoint databases based on geographic regions. A parallel solution on a distributed system could also leverage the aggregate memory-capacity to accommodate larger databases and to perform result caching. For example, the address system 406 can partition an address database into multiple physically distinct nodes based by geo-graphic region(s), e.g., one state per address graph with bigger states like California being split into North and South. The address system 406 can also favor geo-spatially co-located partitions when user geo-spatial location can be pinned down based on IP address, e.g., city and/or state granularity. For example, if searching "First Ave" returns 3,000 results, the generic approach can take the top 8 while the geospatial approach can identify which are closest to the location of the user and take the top 8 of that filtered subset. Each physically distinct node (e.g., a computing system having hardware memory and a hardware processor) stores its own copy of an address graph that covers the geographic region of its partition. Actual address-strings can reside in remote (e.g., cloud-based storage), indexed by unique integer key. Access to the remote storage can be limited to the presentation of the final result to the client; thus, for scalability, the client device can be sent the k-integers corresponding to the k-matches of the search 600A performed by the local node, and the client device can fetch the k-strings from the remote storage. With the disclosed address graphs and search techniques, a solution for all of United States would require an estimated 180 GB of memory per physical node and around 200 GB of cloud-based storage.

Intangibles

Figure 7:
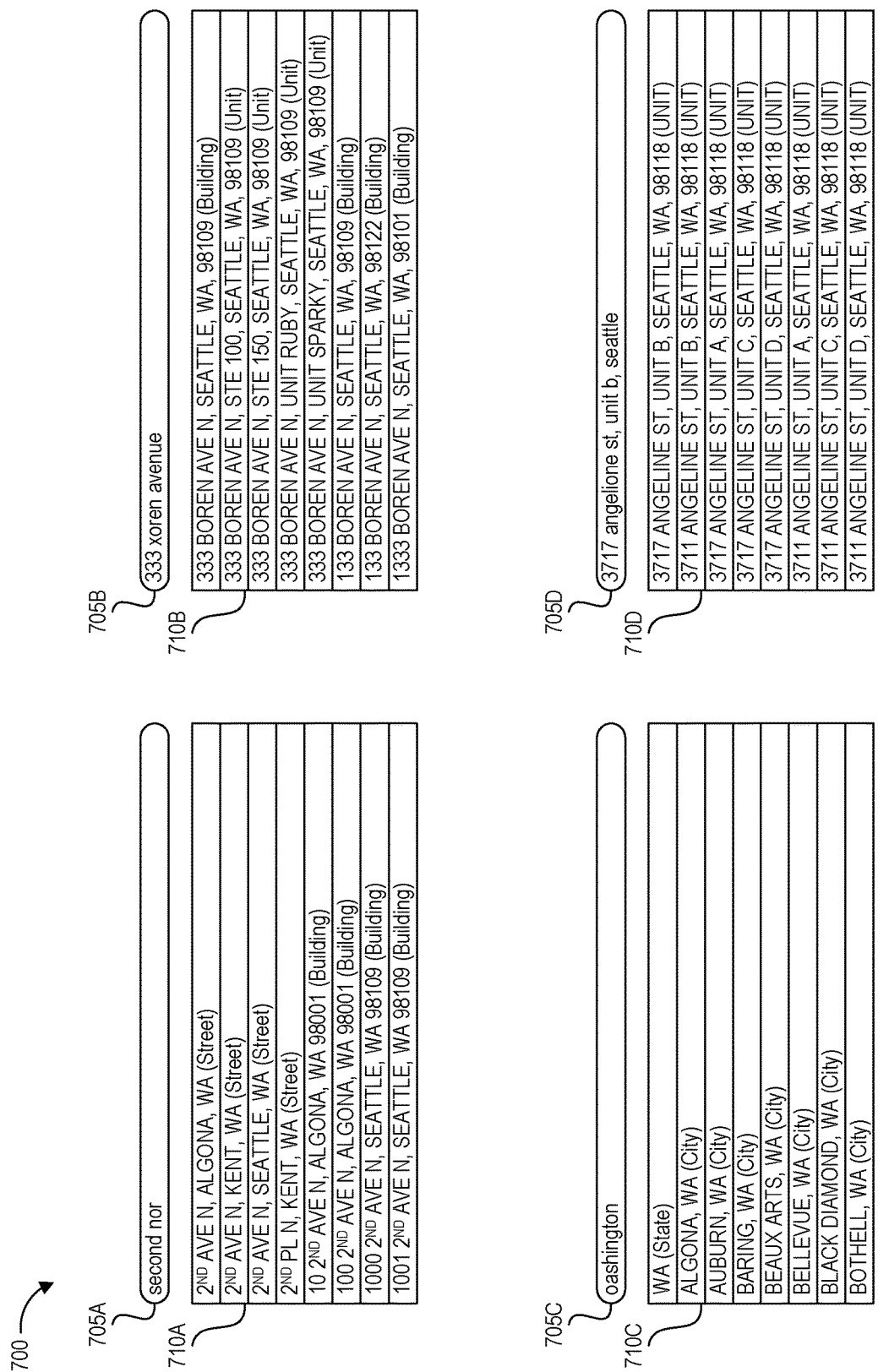
FIG. 7 depicts example user interfaces displaying result sets generating according to the process of FIGS. 6A and 6B.

The viability of an address auto-correction and auto-completion solution in a practical application is arguably as much as function of the quality of the generated results and ease of configuration as it is a function of performance. FIG. 7 presents a sample 700 of the results produced by the implementation on the King County database. The sample 700 highlights the intuitive nature of the results generated by solution, including the value propositions of aliasing (e.g., incorporating address aliases into the graph) and the utilization of hierarchical relationships in result generation.

Specifically, FIG. 7 depicts sample input strings 705A-705D and the corresponding results 710A-710D displayed via a user interface and produced by the cascading transitive-closure state-space search sequence-catalog alignment algorithm with a hierarchical address-database corresponding to King County, Wash., USA. For each input string 705A-705D, FIG. 7 illustrates the top eight results 710A-710D returned by the search 600A. These performance evaluations and the results shown in FIG. 7 illustrate how the disclosed approach is able to provide, in real-time, an intuitive, lexicographically- and hierarchically-ordered list of up to k addresses that are most similar/relevant to the current user input.

In terms of ease of configuration, because the solution is based around the concept of mapping an input onto a finite number of entries in a database that are deemed as most similar according to edit-distance similarity, the solution offers predictable result-generation and, simultaneously, is readily adaptable to different languages, locales and regions. In addition, because the solution utilizes state-space search sequence-alignment, the customization of the computation of edit-distance similarity is straightforward through modification of the tree-search order and/or the penalty scheme, while the same cannot be said of the opaque nature of customizing solutions rooted in dynamic-programming, regular expressions, conditional evaluation, or chained hashing.

Terminology

Implementations disclosed herein provide systems, methods and apparatus for generating cascading transitive-closure sequence-catalog alignment graphs, and to computing alignment between user input and such graphs via iterative-deepening depth-first searching. As used herein, such systems include electronic memory storing computer-executable instructions for performing the described graph tree construction and/or search operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a GPU, a DSP, an ASIC, a FPGA or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
  at least one data repository storing:
    a hierarchical address database including a plurality of address strings, wherein:
      an address string of the plurality of address strings includes a plurality of address-components organized in a sequence according to a hierarchy,
      each address string of the plurality of address strings is associated with a unique identifier, and includes at least some of the plurality of address-components organized in the sequence, and
an address graph representation of the hierarchical address database, wherein the address graph includes:
(i) for particular address-components of the plurality of address-components, a separate graph tree for each of the particular address-components,
(ii) a plurality of paths, wherein each path of the plurality of paths is formed from at least two separate graph trees connected by a tree jump, wherein each path of the plurality of paths encodes a character sequence of a corresponding address string of the plurality of address strings, and
(iii) for each path of the plurality of paths, an association between a terminal vertex of the path and the unique identifier of the corresponding address string; and
one or more processors in communication with the at least one data repository, the one or more computer processor programmed by computer-executable instructions to at least:
receive a new character in a user-input address string;
perform a depth-first search along a subset of the plurality of paths, wherein to perform the depth-first search, the one or more processors are programmed by the computer-executable instructions to at least:
for each path of the subset,
compute an edit distance between the user-input address string and the character sequence encoded by the path;
determine that the edit distance is less than a maximum edit distance;
identify the unique identifier associated with the terminal vertex of the path; and
look up the corresponding address string with the unique identifier associated with the terminal vertex of the path; and
cause output of at least a predetermined number of the corresponding address strings for display.

2. The system of claim 1, wherein the one or more processors are programmed by further computer-executable instructions to at least output at least one corresponding address string of the predetermined number of the corresponding address strings in real-time as the user-input address string is entered.

3. The system of claim 1, wherein the one or more processors are programmed by further computer-executable instructions to at least iteratively perform the depth-first search using increasing values of the maximum edit distance in response to not obtaining the predetermined number of the corresponding address strings.

4. The system of claim 1, wherein the address graph representation of the hierarchical address database is stored at one node of a plurality of nodes, wherein each node of the plurality of nodes stores a different geographically-partitioned subset of the hierarchical address database, and wherein the hierarchical address database is stored in a computer memory remote from the plurality of nodes.

5. The system of claim 4, wherein the one node includes the one or more processors, wherein the at least the one or more processors are programmed by further computer-executable instructions to at least output the unique identifier to a user device to cause the user device to look up at least one corresponding address string of the predetermined number of the corresponding address strings in the hierarchical address database and output the at least one corresponding address string for display, and wherein the user device is remote from and in network communication with the one node and the computer memory storing the hierarchical address database.

6. The system of claim 4, wherein the one node includes the one or more processors, and wherein the one or more processors are programmed by further computer-executable instructions to at least perform a hash lookup in parallel with performing the depth first search.

7. The system of claim 6, wherein the one node comprises a cache storing a hash table representing address strings, wherein the hash table includes, for each input string of a plurality of input strings, an association between the input string and a unique identifier of an address string in the geographically-partitioned subset of the hierarchical address database stored at the one node, and wherein, to perform the hash lookup, the one or more processors are programmed by further computer-executable instructions to at least determine that providing the user-input address string into a hash function returns a hash value corresponding to a unique identifier of an address represented in the hash table.

8. The system of claim 1, wherein the one or more processors are programmed by further computer-executable instructions to confirm that at least one path of the plurality of paths does not encode a bogus address.

9. The system of claim 1, wherein the one or more processors are programmed by further computer-executable instructions to at least compute the edit distance for each path of the subset based at least in part on a penalty value associated with at least one of an insert operation, delete operation, or swap operation that, when performed, causes the user-input address string to match at least a portion of the character sequence corresponding to a length of the user-input address string.

10. A computer-implemented method comprising:
as performed by a computing system including one or more computer processors configured to execute specific instructions,
receiving at least one character in a user-input address string;
accessing an address graph including (i) for particular address-components of a plurality of address-components of an address string, a separate graph tree for each of the particular address-components, wherein the address string is stored in an address database storing a plurality of address strings, wherein the address string is associated with a unique identifier, and wherein each address string of the plurality of address strings includes at least some of the plurality of address-components organized in a sequence, (ii) a plurality of paths, wherein each path of the plurality of paths is formed from at least two separate graph trees connected by a tree jump, wherein each path of the plurality of paths encodes a character sequence of a corresponding address string of the plurality of address strings, and (iii) for each path of the plurality of paths, an association between a terminal vertex of the path and the unique identifier of the corresponding address string;
performing a depth-first search along a subset of the plurality of paths through the at least two separate graph trees to compute, for each path of the subset, an edit distance between the user-input address string and at least a portion of the character sequence encoded by the path;

for each path of the subset, determining that the edit distance is less than a maximum edit distance;

for each path of the subset, looking up the corresponding address string in the address database using the unique identifier associated with the terminal vertex of the path; and causing output of a search result set including at least a predetermined number of the corresponding address strings, for display.

11. The computer-implemented method of claim 10, further comprising iteratively performing the depth-first search using increasing values of a maximum edit distance in response to not returning the search result set including the predetermined number of the plurality of corresponding address strings.

12. The computer-implemented method of claim 10, further comprising confirming that at least one path of the plurality of paths does not encode a bogus address.

13. The computer-implemented method of claim 12, wherein confirming that the at least one path does not encode the bogus address comprises confirming that the unique identifier of at least one address string of the plurality of address strings is associated with all terminal vertices along the at least one path.

14. The computer-implemented method of claim 10, further comprising computing the edit distance for each path of the subset based at least in part on a penalty value associated with at least one of an insert operation, delete operation, or swap operation that, when performed, causes the user-input address string to match at least a portion of the character sequence corresponding to a length of the user-input address string.

15. The computer-implemented method of claim 10, wherein performing the depth-first search and looking up the corresponding address string in the address database are performed by separate computing devices.

16. A non-transitory computer-readable medium storing instructions that, when executed by one or more processors, cause the one or more processors to at least:

receive at least one character in a user-input address string;

access an address graph including (i) for particular address-components of a plurality of address-components of an address string, a separate graph tree for each of the particular address-components, wherein the address string is stored in an address database including a plurality of address strings, and wherein each address string of the plurality of address strings includes a least some of the plurality of address-components organized in a sequence, (ii) a plurality of paths, wherein each path of the plurality of paths is formed from at least two separate graph trees connected by a tree jump, wherein each path of the plurality of paths encodes a character sequence of a corresponding address string of the plurality of address strings, and (iii) for each path of the plurality of paths, an association between a terminal vertex of the path and a unique identifier of the corresponding address string in the address database;

perform a search along a subset of the plurality of paths through the at least two separate graph trees to compute, for each path of the subset, an edit distance between the user-input address string and at least a portion of the character sequence encoded by the path;

for each path of the subset, determine that the edit distance is less than a maximum edit distance;

for each path of the subset, look up the corresponding address string in the address database using the unique identifier associated with the terminal vertex of the path; and cause output of a result set including at least a predetermined number of the corresponding address strings, for display.

17. The non-transitory computer-readable medium of claim 16 including further instructions, that when executed by the one or more processors, further cause the one or more processors to at least output at least one corresponding address string of the predetermined number of the corresponding address strings in a user interface in real-time as the user-input address string in entered in the user interface.

18. The non-transitory computer-readable medium of claim 16 including further instructions, that when executed by the one or more processors, further cause the one or more processors to at least iteratively perform the search using increasing values of a maximum edit distance in response to not returning the result set including the predetermined number of the corresponding address strings.

19. The non-transitory computer-readable medium of claim 16 including further instructions, that when executed by the one or more processors, further cause the one or more processors to at least confirm that at least one path of the plurality of paths does not encode a bogus address.

20. The non-transitory computer-readable medium of claim 19, wherein to confirm that the at least one path does not include the bogus address, the non-transitory computer-readable medium includes further instructions, that when executed by the one or more processors, further cause the one or more processors to at least confirm that the unique identifier of at least one address string of the plurality of address strings is associated with all terminal vertices along the at least one path.

21. The non-transitory computer-readable medium of claim 16, wherein to compute the edit distance for each path of the subset, the non-transitory computer-readable medium includes further instructions, that when executed by the one or more processors, further cause the one or more processors to at least compute the edit distance based at least in part on a penalty value associated with at least one of an insert operation, delete operation, or swap operation that, when performed, causes the user-input address string to match at least a portion of the character sequence corresponding to a length of the user-input address string.

* * * * *